(12) United States Patent
Mitsuyama

(10) Patent No.: US 11,132,152 B2
(45) Date of Patent: Sep. 28, 2021

(54) FIRMWARE UPDATE SYSTEM, ELECTRONIC APPARATUS, AND NON-TRANSITORY COMPUTER-READABLE RECORDING MEDIUM HAVING STORED THEREON FIRMWARE UPDATE PROGRAM

(71) Applicant: KYOCERA Document Solutions Inc., Osaka (JP)

(72) Inventor: Kyota Mitsuyama, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 17/029,352

(22) Filed: Sep. 23, 2020

(65) Prior Publication Data

US 2021/0096782 A1  Apr. 1, 2021

(30) Foreign Application Priority Data

Sep. 27, 2019  (JP) .............................. JP2019-176656

(51) Int. Cl.
 *G06F 3/12* (2006.01)
 *H04N 1/00* (2006.01)
(52) U.S. Cl.
 CPC ............ *G06F 3/123* (2013.01); *G06F 3/1203* (2013.01); *G06F 3/1204* (2013.01); *G06F 3/1224* (2013.01); *G06F 3/1285* (2013.01); *H04N 1/00962* (2013.01)
(58) Field of Classification Search
 None
 See application file for complete search history.

(56) References Cited

U.S. PATENT DOCUMENTS

| 8,711,412 B2 * | 4/2014 | Tokumoto | G06F 3/123 358/1.15 |
| 2004/0120001 A1 * | 6/2004 | Boldon | G06F 3/1204 358/1.15 |
| 2008/0229086 A1 * | 9/2008 | Ferlitsch | G06F 9/44521 713/1 |
| 2019/0373130 A1 * | 12/2019 | Han | G06F 8/62 |

FOREIGN PATENT DOCUMENTS

JP  2017-045302  3/2017

* cited by examiner

*Primary Examiner* — Miya J Williams
(74) *Attorney, Agent, or Firm* — Lex IP Meister, PLLC

(57) ABSTRACT

A firmware update system according to an embodiment is characterized in that the firmware update system, when a target application is installed on an image forming apparatus on which first firmware is installed, installs second firmware that is compatible with the target application, and installs the first firmware on the image forming apparatus when the target application in uninstalled from the image forming apparatus.

4 Claims, 6 Drawing Sheets

FIG. 3

24a VERSION COMPATIBILITY INFORMATION

| MODEL | TYPE OF APPLICATION PROGRAM | APPLICATION VERSION | FIRMWARE VERSION |
|---|---|---|---|
| A | a | 1 | 1, 2, 3 |
| | | 2 | 1, 2, 3 |
| | | 3 | 1, 2, 3 |
| | | 4 | 4, 5 |
| | | 5 | 4, 5 |
| | ⋮ | ⋮ | ⋮ |
| B | a | 1 | 1, 2, 3 |
| | | 2 | 1, 2, 3 |
| | | 3 | 4 |
| | | 4 | 4 |
| | | 5 | 5 |
| | ⋮ | ⋮ | ⋮ |
| ⋮ | ⋮ | ⋮ | ⋮ |

FIRMWARE UPDATE SYSTEM, ELECTRONIC APPARATUS, AND NON-TRANSITORY COMPUTER-READABLE RECORDING MEDIUM HAVING STORED THEREON FIRMWARE UPDATE PROGRAM

INCORPORATION BY REFERENCE

This application is based upon, and claims the benefit of priority from, corresponding Japanese Patent Application No. 2019-176656 filed in the Japan Patent Office on Sep. 27, 2019, the entire contents of which are incorporated herein by reference.

BACKGROUND

Field of the Invention

The present disclosure relates to a firmware update system for updating firmware of an electronic apparatus, an electronic apparatus, and a non-transitory computer-readable recording medium having stored thereon a firmware update program.

Description of Related Art

As a typical firmware update system, a system which also updates, in updating an application program of an electronic apparatus, the firmware of the electronic apparatus to firmware that is compatible with the updated application program is known.

In the case of updating the application program of the electronic apparatus, when the firmware of the electronic apparatus is also updated to firmware that is compatible with the application program, the updated firmware may be incompatible with one of application programs other than the updated application program among the application programs of the electronic apparatus.

For example, in a case where firmware customized for a specific customer has been installed on an electronic apparatus so as to be compatible with a specific application program, if this firmware is simply updated to general-purpose firmware of the latest version, there is a risk of the updated firmware being incompatible with the specific application program.

SUMMARY

A firmware update system of the present disclosure is characterized by including: a new-firmware installing portion which, in at least one of a case where an application program is installed on an electronic apparatus on which firmware is installed, a case where the application program is activated in the electronic apparatus, and a case where execution of the application program is started in the electronic apparatus, installs second firmware as the firmware that is compatible with the application program, on the electronic apparatus on which the first firmware has been installed as the firmware; and an old-firmware installing portion which installs the first firmware on the electronic apparatus in at least one of a case where the application program is uninstalled from the electronic apparatus, a case where the application program is deactivated in the electronic apparatus, and a case where the execution of the application program is ended in the electronic apparatus.

An electronic apparatus of the present disclosure relates to an electronic apparatus on which firmware is installed, and is characterized by including: a new-firmware installing portion which, in at least one of a case where an application program is installed on the electronic apparatus, a case where the application program is activated in the electronic apparatus, and a case where execution of the application program is started in the electronic apparatus, installs second firmware as the firmware that is compatible with the application program on the electronic apparatus on which the first firmware has been installed as the firmware; and an old-firmware installing portion which installs the first firmware on the electronic apparatus in at least one of a case where the application program is uninstalled from the electronic apparatus, a case where the application program is deactivated in the electronic apparatus, and a case where the execution of the application program is ended in the electronic apparatus.

A non-transitory computer-readable recording medium of the present disclosure stores a firmware update program thereon, and the firmware update program causes an electronic apparatus to implement functions of: a new-firmware installing portion which, in at least one of a case where an application program is installed on the electronic apparatus on which firmware is installed, a case where the application program is activated in the electronic apparatus, and a case where execution of the application program is started in the electronic apparatus, installs second firmware, as the firmware that is compatible with the application program, on the electronic apparatus on which the first firmware has been installed as firmware; and an old-firmware installing portion which installs the first firmware on the electronic apparatus in at least one of a case where the application program is uninstalled from the electronic apparatus, a case where the application program is deactivated in the electronic apparatus, and a case where the execution of the application program is ended in the electronic apparatus.

BRIEF DESCRIPTION OF THE DRAWINGS

FIG. 3 is a diagram showing an example of version compatibility information shown in FIG. 2;

DETAILED DESCRIPTION

The following describes embodiments of the present disclosure referring to the accompanying drawings.

First, a configuration of a firmware update system according to one embodiment of the present disclosure will be described.

Figure 1:
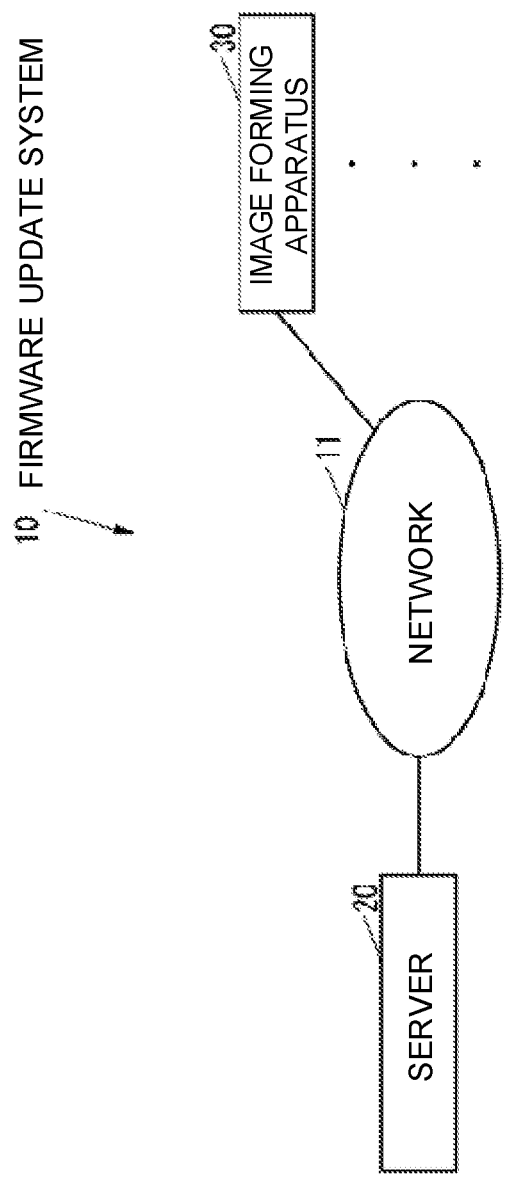
FIG. 1 is a block diagram of a firmware update system according to an embodiment of the present disclosure.

FIG. 1 is a block diagram of a firmware update system 10 according to the present embodiment.

As illustrated in FIG. 1, the firmware update system 10 includes a server 20, and an image forming apparatus 30 as an electronic apparatus that is managed by the server 20. The firmware update system 10 can include at least one image forming apparatus having a configuration similar to that of the image forming apparatus 30, apart from the image forming apparatus 30.

The server 20 may be configured with a single computer, or may be configured with multiple computers. The server 20 may be configured with a cloud server.

The image forming apparatus is constituted by, for example, a multifunction peripheral (MFP), a print-only machine, and the like.

The server 20 and the image forming apparatus can communicate with each other via a network 11 such as a local area network (LAN) and the Internet.

Figure 2:
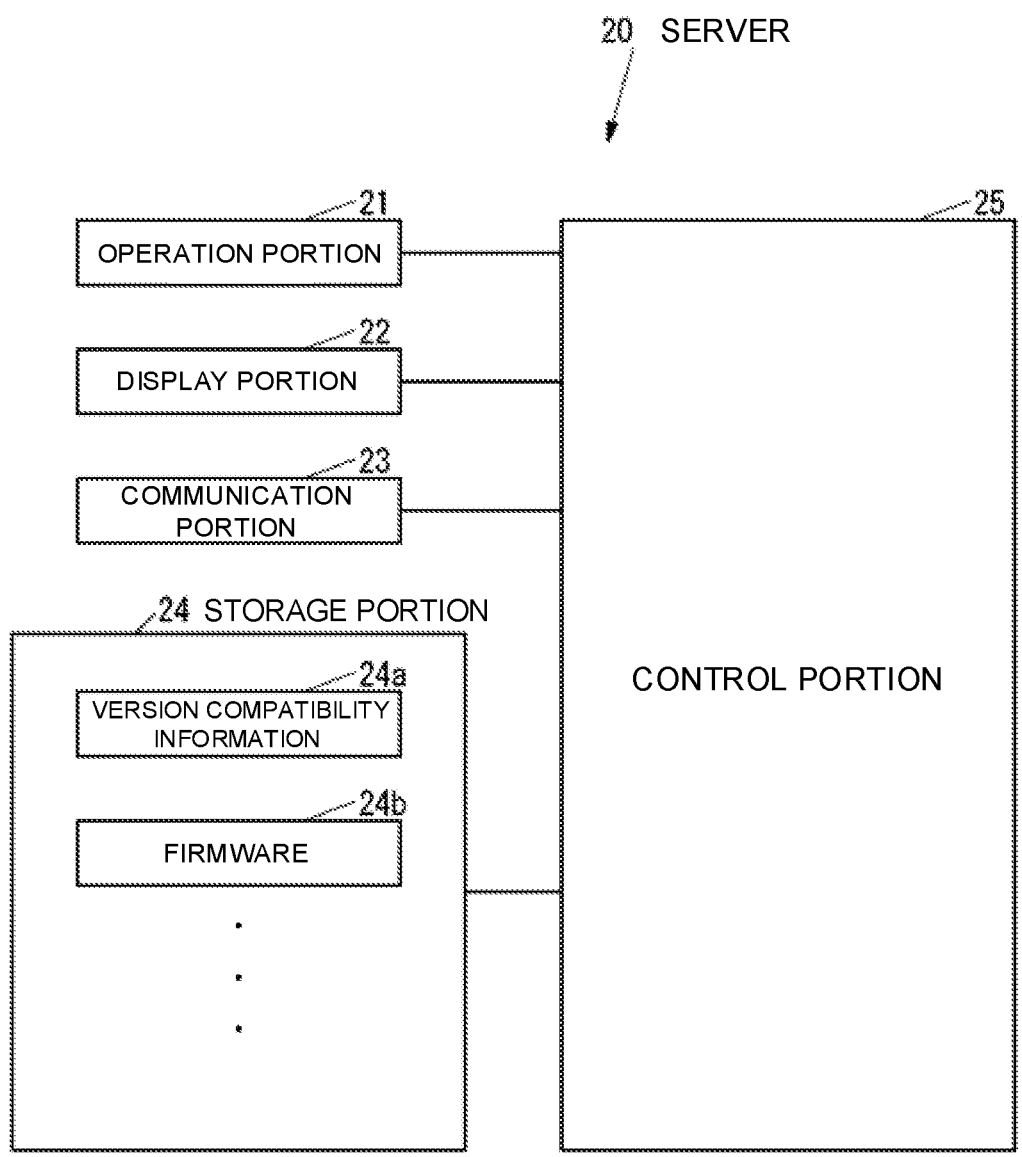
FIG. 2 is a block diagram of a server shown in FIG. 1 in a case where the server is configured with a single computer.

FIG. 2 is a block diagram of the server 20 in a case where the server 20 is configured with a single computer.

As illustrated in FIG. 2, the server 20 comprises: an operation portion 21, which is an input device such as a mouse and a keyboard by which various operations by the user are input; a display portion 22, which is a display device such as a liquid crystal display (LCD) that displays various kinds of information; a communication portion 23, which is a communication device that communicates with an external device via the network 11 (FIG. 1); a storage portion 24, which is a nonvolatile storage device such as a semiconductor memory or hard disk drive (HDD) storing various kinds of data; and a control portion 25 which controls the server 20 as a whole.

The storage portion 24 stores version compatibility information 24a indicating a correspondence between the version of an application program for the image forming apparatus (hereinafter referred to as an "application version") and the version of firmware for the image forming apparatus (hereinafter referred to as a "firmware version").

FIG. 3 is a diagram showing an example of the version compatibility information 24a.

The version compatibility information 24a shown in FIG. 3 indicates the correspondence between the version of the application program for the image forming apparatus and the version of the firmware for the image forming apparatus for each model of the image forming apparatus, and the type of the application program.

With respect to application program a of model A, firmware versions 1 to 3 are compatible with application versions 1 to 3, and firmware versions 4 and 5 are compatible with application versions 4 and 5. For example, it is considered that an application programming interface (API) that did not exist in the application program of application version 3 has been added to the application program of application version 4, and such an API is also added to the firmware of firmware version 4 in accordance with the addition. Here, a case where the application program of the image forming apparatus of model A is that of application version 4 or 5, and the version of the firmware of the above image forming apparatus is one of versions 1 to 3 is assumed. In this case, when the API not provided in the aforementioned firmware is used by the application program, an error occurs because there is no destination of calling.

With respect to application program a of model B, firmware versions 1 to 3 are compatible with application versions 1 and 2, firmware version 4 is compatible with application versions 3 and 4, and firmware version 5 is compatible with application version 5. For example, it is considered that an API that did not exist in the application program of application version 2 has been added to the application program of application version 3, and such an API is also added to the firmware of firmware version 4 in accordance with the addition. Also, it is considered that an API that did not exist in the application program of application version 4 has been added to the application program of application version 5, and such an API is also added to the firmware of firmware version 5 in accordance with the addition. Here, a case where the application program of the image forming apparatus of model B is that of application version 3 or 4, and the version of the firmware of the above image forming apparatus is one of versions 1 to 3 is assumed. In this case, when the API not provided in the aforementioned firmware is used by the application program, an error occurs because there is no destination of calling. Further, a case where the application program of the image forming apparatus of model B is that of application version 5, and the version of the firmware of the above image forming apparatus is one of versions 1 to 4 is assumed. In this case, when the API not provided in the aforementioned firmware is used by the application program, an error occurs because there is no destination of calling.

As illustrated in FIG. 2, the storage portion 24 stores firmware 24b for the image forming apparatus. Apart from the firmware 24b, the storage portion 24 stores other firmware for the image forming apparatus. The storage portion 24 stores the firmware for each combination of the model of the image forming apparatus and the version of the firmware.

The control portion 25 includes, for example, a central processing unit (CPU), a read-only memory (ROM) which stores a program and various kinds of data, and a random-access memory (RAM) used as a work area for the CPU of the control portion 25. The CPU of the control portion 25 executes the program which is stored in the ROM of the control portion 25 or the storage portion 24.

Figure 4:
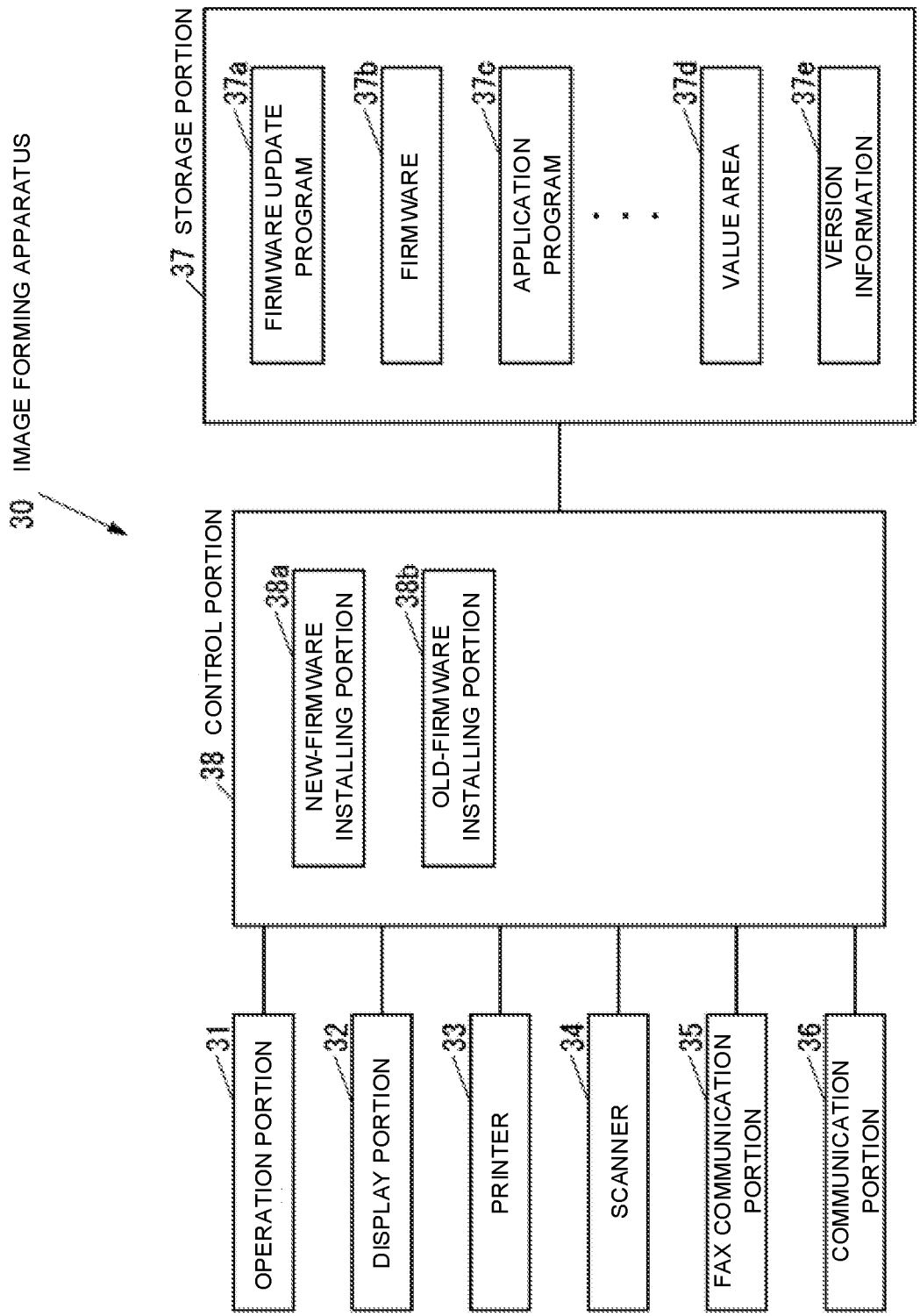
FIG. 4 is a block diagram of an image forming apparatus shown in FIG. 1 in a case where the image forming apparatus is a multifunction peripheral (MFP)

FIG. 4 is a block diagram of the image forming apparatus 30 in a case where the image forming apparatus 30 is an MFP.

As illustrated in FIG. 4, the image forming apparatus 30 comprises: an operation portion 31, which is an operation device such as a button by which various operations are input; a display portion 32, which is a display device such as an LCD that displays various kinds of information; a printer 33, which is a print device that prints an image on a recording medium such as paper; a scanner 34, which is a reading device that reads an image from a document; a fax communication portion 35, which is a fax device that performs fax communication with an external facsimile machine (not shown) via a communication line such as a public telephone line; a communication portion 36, which is a communication device that communicates with an external device via a network such as the LAN and the Internet, or communicates with the external device directly by wire or wirelessly not by way of the network; a storage portion 37, which is a nonvolatile storage device such as a semiconductor memory or an HDD storing various kinds of information; and a control portion 38 which controls the image forming apparatus 30 as a whole.

The storage portion 37 can store a firmware update program 37a for updating the firmware of the image forming apparatus 30. The firmware update program 37a may be installed on the image forming apparatus 30 at the stage of manufacturing the image forming apparatus 30, for example, or may be additionally installed on the image forming apparatus 30 from an external storage medium such as a universal serial bus (USB) flash drive or a secure digital (SD) card, or from the network.

The storage portion 37 stores firmware 37b of the image forming apparatus 30.

The storage portion 37 stores an application program 37c of the image forming apparatus 30. Apart from the application program 37c, the storage portion 37 can store at least one application program of the image forming apparatus 30.

The storage portion 37 can secure a value area 37d in which a value of at least one item of a specific history, such as a job history of the image forming apparatus 30, and a specific setting, such as a system setting, is stored. Here, the value area 37d is an area not to be deleted when the firmware of the image forming apparatus 30 is updated. Note that the system settings include, for example, a network setting, a sleep timer setting indicating a duration time of a non-operation state for the image forming apparatus 30 to shift to a sleep mode, and a paper feed setting indicating from which paper feed cassette of the image forming apparatus 30 the paper is fed.

The storage portion 37 can store version information 37e indicating the version of the firmware before being updated in the image forming apparatus 30. The version information 37e is stored in an area that is not deleted when the firmware of the image forming apparatus 30 is updated.

The control portion 38 includes, for example, a CPU, a ROM which stores a program and various kinds of data, and a RAM as a memory used as a work area for the CPU of the control portion 38. The CPU of the control portion 38 executes the program which is stored in the storage portion 37 or the ROM of the control portion 38.

As the control portion 38 executes the firmware update program 37a, the control portion 38 achieves a new-firmware installing portion 38a which installs new firmware that is compatible with the application program onto the image forming apparatus 30, and an old-firmware installing portion 38b which installs the original firmware onto the image forming apparatus 30.

Next, the operation of the firmware update system 10 will be described.

First, the operation of the firmware update system 10 in a case where an application program (hereinafter referred to as a "target application") is installed on the image forming apparatus 30 will be described.

Figure 5:
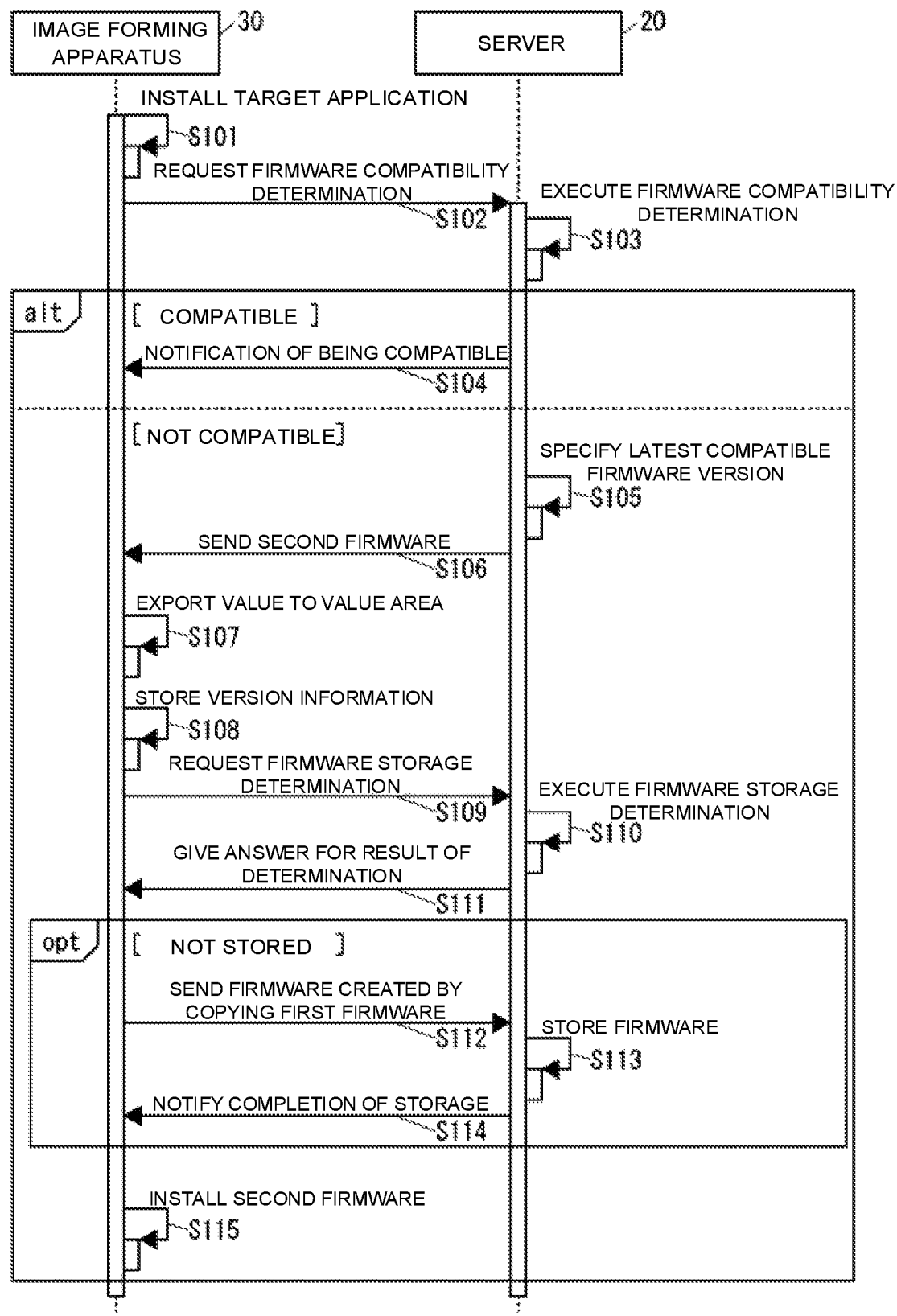
FIG. 5 is a sequence diagram of an operation of the firmware update system shown in FIG. 1 in a case where a target application is installed on the image forming apparatus.

FIG. 5 is a sequence diagram of the operation of the firmware update system 10 in a case where the target application is installed on the image forming apparatus 30.

A user can input, to the image forming apparatus 30 via the operation portion 31 or the communication portion 36, an instruction to install the target application. The new-firmware installing portion 38a of the image forming apparatus 30 executes the operation shown in FIG. 5 when the instruction to install the target application is input. Here, the user may be a developer of the application program. In a case where the user is the developer of the application program, the target application may be an application program being developed by the user.

As shown in FIG. 5, the new-firmware installing portion 38a installs the target application on the image forming apparatus 30 (S101).

Next, the new-firmware installing portion 38a requests the server 20 to determine whether or not the firmware (hereinafter referred to as "first firmware") currently installed on the image forming apparatus 30 is compatible with the target application (hereinafter referred to as "firmware compatibility determination") (S102). Here, the request in S102 includes the model of the image forming apparatus 30, the version of the first firmware, and the type and the version of the target application.

When the control portion 25 of the server 20 receives the request of S102, the control portion 25 executes the firmware compatibility determination on the basis of the information on the model of the image forming apparatus 30, the version of the first firmware, and the type and the version of the target application included in the request of S102, and the version compatibility information 24a (S103).

When the control portion 25 determines that the first firmware is compatible with the target application in S103, the control portion 25 notifies the image forming apparatus 30 that the first firmware is compatible with the target application (S104).

When the new-firmware installing portion 38a of the image forming apparatus 30 receives the notification of S104 from the server 20, the operation shown in FIG. 5 is ended.

When the control portion 25 of the server 20 determines that the first firmware is not compatible with the target application in S103, the control portion 25 specifies the latest firmware version that is compatible with the target application in the image forming apparatus 30, on the basis of the information on the model of the image forming apparatus 30, and the type and the version of the target application included in the request of S102, and the version compatibility information 24a (S105).

After processing of S105 has been performed, the control portion 25 reads the firmware (hereinafter referred to as "second firmware") of the firmware version specified in S105 from the storage portion 24, and sends it to the image forming apparatus 30 (S106).

When the new-firmware installing portion 38a of the image forming apparatus 30 receives the second firmware sent from the server 20 in S106, a value of at least one item of the history and the settings in the image forming apparatus 30 is exported to the value area 37d (S107).

After processing of S107 has been performed, the new-firmware installing portion 38a stores the version information 37e indicating the version of the first firmware in the storage portion 37 (S108).

After processing of S108 has been performed, the new-firmware installing portion 38a requests the server 20 to determine whether or not the server 20 stores the first firmware (hereinafter referred to as "firmware storage determination") (S109).

When the control portion 25 of the server 20 receives the request of S109, the control portion 25 executes the firmware storage determination (S110).

The control portion 25 gives an answer for a result of the determination of S110 to the image forming apparatus 30 (S111).

When the new-firmware installing portion 38a of the image forming apparatus 30 receives an answer in S111 that the server 20 does not store the first firmware, the new-firmware installing portion 38a sends the firmware, which is created by copying the first firmware, to the server 20 (S112).

When the control portion 25 of the server 20 receives the firmware sent from the image forming apparatus 30 in S112, the control portion 25 stores the received firmware in the storage portion 24 (S113).

When the control portion 25 completes the storage of S113, the control portion 25 notifies the image forming apparatus 30 that the storage of S113 is completed (S114).

When the new-firmware installing portion 38a of the image forming apparatus 30 receives an answer in S111 that the server 20 stores the first firmware, or receives the notification of S114, the new-firmware installing portion 38a installs the second firmware that has been sent from the server 20 in S106 (S115). That is, the new-firmware installing portion 38*a* updates the first firmware to the second firmware.

When the processing of S115 comes to an end, the new-firmware installing portion 38*a* ends the operation shown in FIG. 5.

Next, the operation of the firmware update system 10 in a case where the target application is uninstalled from the image forming apparatus 30 will be described.

Figure 6:
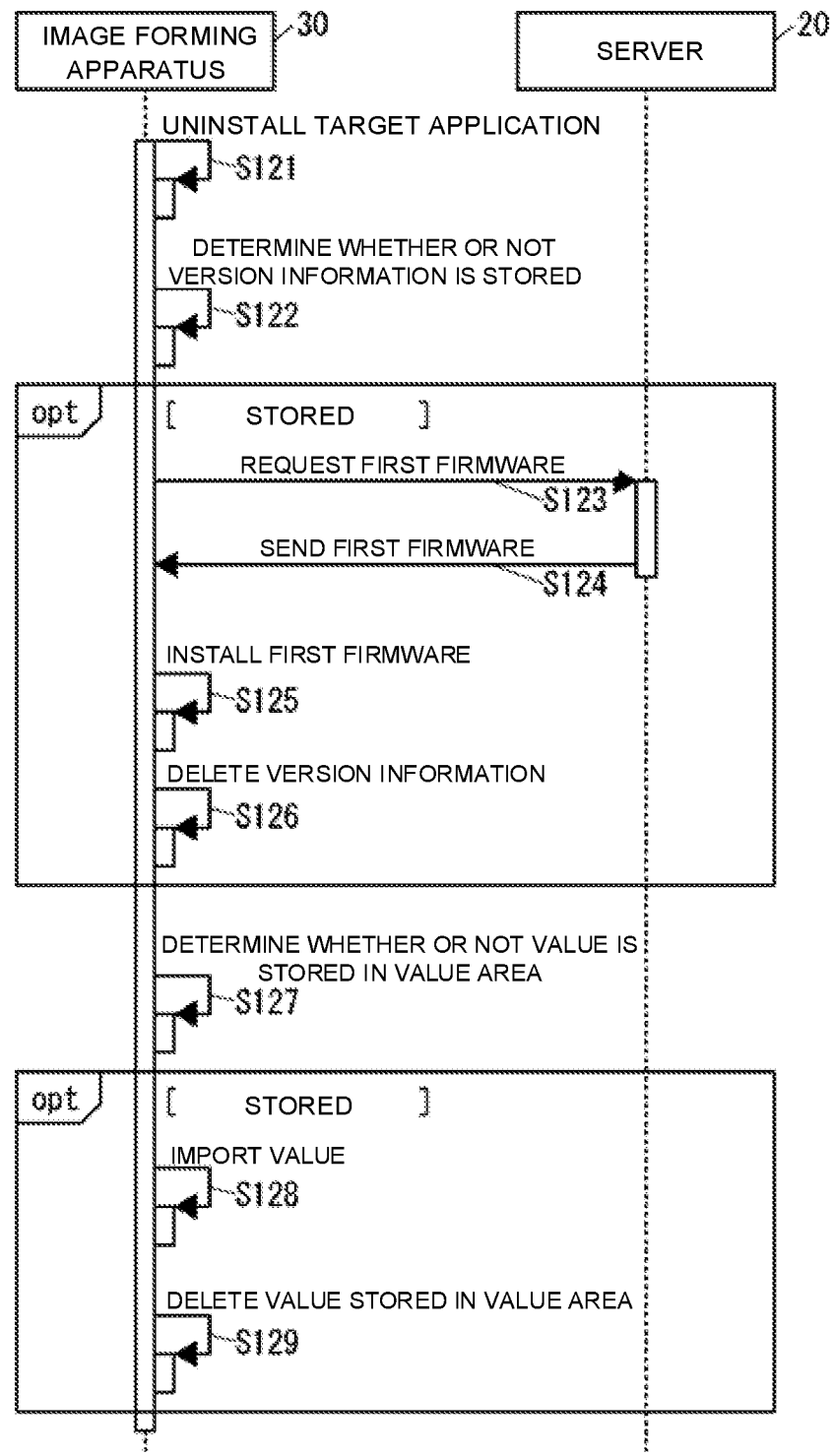
FIG. 6 is a sequence diagram of an operation of the firmware update system shown in FIG. 1 in a case where the target application is uninstalled from the image forming apparatus.

FIG. 6 is a sequence diagram of the operation of the firmware update system 10 in a case where the target application is uninstalled from the image forming apparatus 30.

A user can input, to the image forming apparatus 30 via the operation portion 31 or the communication portion 36, an instruction to uninstall the target application. The old-firmware installing portion 38*b* of the image forming apparatus 30 executes the operation shown in FIG. 6 when the instruction to uninstall the target application is input.

As shown in FIG. 6, the old-firmware installing portion 38*b* uninstalls the target application from the image forming apparatus 30 (S121).

After processing of S121 has been performed, the old-firmware installing portion 38*b* determines whether or not the version information 37*e* is stored (S122).

When the old-firmware installing portion 38*b* determines in S122 that the version information 37*e* is stored, the old-firmware installing portion 38*b* requests the firmware of the firmware version that is stored in the version information 37*e*, in other words, the first firmware, to the server 20 (S123). Here, the request in S123 includes the model of the image forming apparatus 30 and the firmware version stored in the version information 37*e*.

When the control portion 25 of the server 20 receives the request of S123, the control portion 25 reads the firmware being requested in S123, in other words, the first firmware, from the storage portion 24, and sends it to the image forming apparatus 30 (S124).

When the old-firmware installing portion 38*b* of the image forming apparatus 30 receives the first firmware sent from the server 20 in S124, the old-firmware installing portion 38*b* installs the received first firmware (S125).

After processing of S125 has been performed, the old-firmware installing portion 38*b* deletes the version information 37*e* (S126).

When the old-firmware installing portion 38*b* determines in S122 that the version information 37*e* is not stored, or ends the processing of S126, the old-firmware installing portion 38*b* determines whether or not a value of at least one item of the history and the settings is stored in the value area 37*d* (S127).

When the old-firmware installing portion 38*b* determines in S127 that the value of at least one item of the history and the settings is stored in the value area 37*d*, the old-firmware installing portion 38*b* imports the value of at least one item of the history and the settings, which is stored in the value area 37*d*, to the image forming apparatus 30 (S128).

Next, the old-firmware installing portion 38*b* deletes the value stored in the value area 37*d* (S129).

When the old-firmware installing portion 38*b* determines in S127 that the value of at least one item of the history and the settings is not stored in the value area 37*d*, or executes the processing of S129, the operation shown in FIG. 6 is ended.

As described above, in the firmware update system 10, when an application program is installed on the image forming apparatus in S101, the firmware that is compatible with the application program is automatically installed on the image forming apparatus (S115). Thus, it is possible to suppress occurrence of a problem in which the firmware is not compatible with the application program.

If the application program is uninstalled from the image forming apparatus in S121, the firmware update system 10 automatically installs the original firmware on the image forming apparatus (S125). Thus, it is possible to suppress occurrence of a problem in which the firmware is not compatible with the application program other than the uninstalled application program.

In the firmware update system 10, since there is no need to make the user be conscious of the version of the firmware, convenience can be improved.

In the present embodiment, the firmware update system 10 stores the version information, which indicates the version of the firmware before being updated in the image forming apparatus, in the image forming apparatus itself. However, the firmware update system 10 may store the version information indicating the version of the firmware before being updated in the image forming apparatus in a place other than the image forming apparatus itself. For example, the firmware update system 10 may store the version information indicating the version of the firmware before being updated in the image forming apparatus in the server 20.

The firmware update system 10 stores a value of at least one item of the history and the settings in the image forming apparatus (S107) when installing an application program on the image forming apparatus in S101, and restores the value of the item to the stored value (S128) when installing the original firmware on the image forming apparatus in S125. Therefore, if the application program is uninstalled from the image forming apparatus, the value of at least one item of the history and the settings in the image forming apparatus can be reinstated to that before the application program is installed on the image forming apparatus.

In the present embodiment, the firmware update system 10 stores the value of at least one item of the history and the settings in the image forming apparatus in the image forming apparatus itself. However, the firmware update system 10 may store the value of at least one item of the history and the settings in the image forming apparatus in a place other than the image forming apparatus itself. For example, the firmware update system 10 may store the value of at least one item of the history and the settings in the image forming apparatus in the server 20.

It is also possible to make the setting so that the firmware update system 10 does not store the value of at least one item of the history and the settings for an application program, which has been temporarily installed on the image forming apparatus such as an application program being developed by the user, in S107.

In the firmware update system 10, the processing of S107 and the processing of S127 to S129 may be omitted.

In the present embodiment, when an application program is installed on the image forming apparatus in S101, the firmware update system 10 installs the firmware that is compatible with the application program on the image forming apparatus (S115). However, in addition to or in place of the case where the application program is installed on the image forming apparatus in S101, the firmware update system 10 may install the firmware that is compatible with the application program on the image forming apparatus in at least one of the case where the application program is activated in the image forming apparatus and the case where execution of the application program is started in the image forming apparatus.

In the present embodiment, if an application program is uninstalled from the image forming apparatus in S121, the firmware update system 10 installs the original firmware on the image forming apparatus (S125). However, in addition to or in place of the case where the application program is uninstalled from the image forming apparatus in S121, the firmware update system 10 may install the original firmware on the image forming apparatus in at least one of the case where the application program is deactivated in the image forming apparatus and the case where execution of the application program is ended in the image forming apparatus.

In the firmware update system 10, at least a part of the functions of the server 20 that are described in the present embodiment may be realized by the image forming apparatus. For example, of the functions of the server 20, if all of the functions described in the present embodiment are realized by the image forming apparatus, the firmware update system 10 does not need to include the server 20.

In the firmware update system 10, a part of the functions of the image forming apparatus that are described in the present embodiment may be realized by the server 20.

The electronic apparatus of the present disclosure is represented as an image forming apparatus in the embodiment. However, electronic apparatuses other than the image forming apparatus such as a PC may alternatively be applied.

What is claimed is:

1. A firmware update system comprising:
   a memory; and
   a processor that:
   in at least one of a case where an application program is installed on an electronic apparatus on which first firmware has been installed, a case where the application program is activated in the electronic apparatus, and a case where execution of the application program is started in the electronic apparatus, stores version information of the first firmware in the memory and installs second firmware that is compatible with the application program, on the electronic apparatus to update the first firmware to the second firmware; and
   installs the first firmware on the electronic apparatus in accordance with the version information stored in the memory, in at least one of a case where the application program is uninstalled from the electronic apparatus, a case where the application program is deactivated in the electronic apparatus, and a case where the execution of the application program is ended in the electronic apparatus.

2. The firmware update system according to claim 1, wherein the processor
   stores a value of at least one item of history and a setting in the electronic apparatus in the memory when installing the second firmware on the electronic apparatus; and
   restores a value of the item to the value stored by the processor when installing the first firmware on the electronic apparatus.

3. An electronic apparatus on which first firmware has been installed, the electronic apparatus comprising:
   a memory; and
   a processor that:
   in at least one of a case where an application program is installed on the electronic apparatus, a case where the application program is activated in the electronic apparatus, and a case where execution of the application program is started in the electronic apparatus, stores version information of the first firmware in the memory and installs second firmware that is compatible with the application program, on the electronic apparatus to update the first firmware has been installed as to the second firmware; and
   installs the first firmware on the electronic apparatus in accordance with the version information stored in the memory, in at least one of a case where the application program is uninstalled from the electronic apparatus, a case where the application program is deactivated in the electronic apparatus, and a case where the execution of the application program is ended in the electronic apparatus.

4. A non-transitory computer-readable recording medium having stored thereon a firmware update program, the firmware update program causing a processor included in an electronic apparatus on which first firmware has been installed, to:
   in at least one of a case where an application program is installed on the electronic apparatus, a case where the application program is activated in the electronic apparatus, and a case where execution of the application program is started in the electronic apparatus, store version information of the first firmware in a memory of the electronic apparatus and install second firmware that is compatible with the application program, on the electronic apparatus to update first firmware to the second firmware; and
   install the first firmware on the electronic apparatus in accordance with the version information stored in the memory, in at least one of a case where the application program is uninstalled from the electronic apparatus, a case where the application program is deactivated in the electronic apparatus, and a case where the execution of the application program is ended in the electronic apparatus.

* * * * *